United States Patent Office 3,712,883
Patented Jan. 23, 1973

3,712,883
CARBOXYALKYL ETHERS OF
GALACTOMANNAN GUMS
Robert Nordgren, Minneapolis, Minn., assignor to
General Mills, Inc., Minneapolis, Minn.
No Drawing. Filed Feb. 3, 1970, Ser. No. 8,439
Int. Cl. C07c 47/18
U.S. Cl. 260—209 R     6 Claims

ABSTRACT OF THE DISCLOSURE

A halo fatty acid derived carboxyalkyl ether of galactomannan gum having a degree of substitution of 0.6–2.0. The substituted gum can be reacted with calcium to obtain improved stabilized thickeners and gellants.

---

This application relates to galactomannan gums. More specifically, this application relates to carboxyalkyl ethers of galactomannan gums having a degree of substitution of 0.6–2.0.

Carboxyalkyl ethers of galactomannan gums prepared from halo fatty acids have been known in the prior art, e.g. U.S. 2,520,161. However, carboxyalkyl ethers of galactomannan gums when prepared from halo fatty acids as disclosed in the prior art have an upper limit to the degree of substitution of around 0.5. By degree of substitution (D.S.) as used herein is meant the average substitution of carboxyalkyl ether groups per anhydro sugar unit. In guar, for example, the basic unit of the polymer is comprised of two mannose units with a glycosidic linkage and a galactose unit attached to one of the hydroxyls of the mannose units. On the average, each of the sugar units has three available hydroxyl sites. A D.S. of 3 would mean that all of the available hydroxy sites had reacted to form carboxyalkyl ether. A D.S. of 1 would mean that one-third of the available hydroxyls had reacted. It has now been found that higher D.S. products from the halo fatty acids can be obtained, i.e. halo fatty acid derived ethers of galactomannans having a D.S. of 0.6–2.0. In addition, the higher D.S. products can be mixed with a minute amount of calcium salt, thereby greatly increasing the effectiveness of the substituted galactomannan gum. It has been found that calcium produces the increase in effectiveness when combined with a high D.S. carboxyalkyl ether galactomannan gums. The reaction of calcium salts with high D.S. carboxyalkyl ethers of galactomannan gums are disclosed in Calcium Carboxyalkyl Ethers of Galactomannan Gums, U.S. Ser. No. 8,440, filed even date herewith and a continuation-in-part of U.S. Ser. No. 680,016 filed Nov. 2, 1967 and now abandoned. Furthermore, the low D.S. products of the prior art do not apear to react with calcium as do the high D.S. products of this invention. Other divalent cations such as Mg, Ba or Sr seem to have little or no effect on the thickening or gelling properties of the galactomannan gums after carboxyalkylation.

By reacting the carboxyalkyl ethers of galactomannan gums or the soluble salts thereof having a high D.S., e.g. 0.6–2.0, most preferably 0.6–1.6, with an excess of a calcium salt, it is possible to produce a precipitate. It is also possible to extrude the carboxyalkyl ether of galactomannan gum into a sufficient amount of solution containing at least 1% calcium, thereby producing a calcium carboxyalkyl galactomannan fiber which can be impregnated with food particles such as protein carbohydrates and flavoring and coloring agents. Because of the last discovery, it is possible to produce analogues of certain protein containing foods such as ham.

To prepare the unique compounds of this invention, it is essential that the carboxyalkyl ether of galactomannan gum have a high D.S. The high D.S. carboxyalkyl galactomannan gums are usually prepared in the form of the alkali metal salt thereof, e.g. sodium carboxymethyl galactomannan. The sodium carboxymethyl galactomannan having a D.S. of 0.6–2.0 can be prepared as follows. To prepare the products of this invention, it is necessary to first treat the galactomannan gum with a halo fatty acid followed by treatment with an alkali metal hydroxide. The resulting product, when prepared as disclosed herein, will be an alkali metal salt of a carboxyalkyl galactomannan gum and will have a D.S. of 0.6–2.0, preferably 0.6–1.6.

All amounts as used herein are parts by weight. The alkali metal salts of carboxyalkyl ethers of galactomannan gums are prepared by dry mixing 100 parts of a galactomannan gum, and 55 to 190, preferably 90 to 110, parts of a dry powder halo fatty acid or salt of a halo fatty acid. An aqueous solution of an alkali metal hydroxide, preferably sodium hydroxide, is added in an amount of 20 to 65, preferably 38 to 46, parts as a solution of up to 73% concentration. The addition of sodium hydroxide is done drop-wise over a period of approximately 10 minutes. After addition of the hydroxide, the mixture is mixed for 10 minutes at room temperature and heated for a period of time. The temperature and time are variable such as at room temperature for one day but preferably 50–60° C. for 2–3 hours. If too much water is used, the product fuses to a viscous dough which cannot be easily handled. The product is dried until the moisture content is less than 15% and then ground to pass a 50 mesh screen. The product is then extracted with an aqueous 80/20-methanol/water solution by mixing the product in a blender with the methanol solution under moderate stirring at 25–30° C. for 20 minutes. Sufficient acetic acid is added to the blender to neutralize the product. The product is then filtered and dried. The extraction process is repeated twice more without the neutralization step. The final product has a good yield and a D.S. of 0.6–2.0. The specific D.S. is controlled by the amount of the reactants used. It is to be noted that no aqueous hydroxide is added to the reactant prior to complete dry mixing of the galactomannan gum and the halo fatty acid.

A typical example of the above process is to completely dry mix 200 g. commercially available guar flour and 200 g. of powdered sodium chloroacetate. After dry mixing, 72 g. sodium hydroxide is dissolved in 140 ml. of water and the aqueous hydroxide solution added drop-wise to the dry mixture during a 10 minute period. The product when processed as above will have a D.S. of 1.1–1.2.

Suitable halo fatty acids include chloroacetic acid, chloropropionate, chlorobutyrate, other halo fatty acids and the salts of halo fatty acids. The halo fatty acids can have 2 to 4 carbon atoms in the fatty chain.

The term "galactomannans" as used herein includes the general class of polysaccharides containing both galactose and mannose units. The galactomannans are usually found in the endosperm sections of leguminous seeds such as guar, locust bean, honey locust, flametree and *Cassia occidentalis*.

To obtain the unique features of the calcium substituted salt, it is first essential to start with the carboxyalkyl ether of galactomannan gum having a high D.S. as described above. It is then possible to combine the carboxyalkyl ether of galactomannan gum with calcium in an aqueous medium. If the carboxyalkyl ether of galactomannan gum has a D.S. of greater than 0.6 and there is an excess of calcium in the medium, a precipitate will result. If the carboxyalkyl galactomannan gum is extruded into an excess of calcium, a fiber will be produced. The carboxyalkyl galactomannan gum may be placed in a calcium bath first and then extruded into a calcium medium if desired.

It is possible to obtain both water soluble and water insoluble fibers, depending upon the range of D.S. values used. It appears that if the D.S. is greater than 1.4, the fibers formed will be water insoluble. Suitable calcium salts which can be used in combination with the alkali salts of carboxylalkyl ether of galactomannan gums include the following calcium salts: calcium chloride, calcium acetate, calcium lactate, and other calcium salts which will liberate calcium when mixed with the etherified gum. As can be seen from the examples, minute amounts of the calcium salt will produce a substantial viscosity increase.

The thickening agent, the gelling, and both the water soluble and water insoluble fibers have great utility in a multiplicity of food and industrial uses. The examples given below will further illustrate a variety of applications to which the product of this invention can be applied.

EXAMPLE I

The following ingredients were added to a double Z-blade jacketed reactor:

100 grams of commercial guar flour
175 grams of powdered sodium chloroacetate

After the dry ingredients were completely mixed, 62 grams of sodium hydroxide were dissolved in 85 grams of water. This mixture was added drop-wise to the dry mixture over a 10 minute period. During the addition of the sodium hydroxide, the reatcor was cooled with cooling water in the jacket.

After 10 minutes more of mixing at room temperature, the reactor was heated by circulating water through the jacket at 50–55° C. After 30 minutes, the reactor mixture was at 59° C. The hot water in the jacket was shut off and the reactants gradually allowed to cool to room temperature during a 4 hour period of intermittent mixing. The reaction mass was now a damp fluffy material with only a little tendency to be sticky. It was dried in an oven at 50° C. and then ground to −65 mesh. This crude product was then extracted or washed three times with 80% methanol/20% water mixture in a Waring Blender. The product was filtered after each washing. Four mls. of acetic acid were added to the first wash to lower the pH. The washed product was dried in an oven at 50° C. and had the following properties:

Yield _____ 147 grams.
Moisture _____ 6.8%.
2% viscosity _____ 950 cps.
pH of solution _____ 7.7.
ASH _____ 26.3, 26.4.
D.S. _____ 1.65 calculated from ash content.

EXAMPLE II

Example I was repeated with the following ingredients:

1000 grams of commercial guar flour
583 grams of powdered sodium chloroacetate
231 grams of sodium hydroxide
1000 grams of water After dry mixing and drop-wise addition of the sodium hydroxide as in Eyample I, warm water was then circulated through the jacket of the mixer at 65° C. for a period of two hours. The damp fluffy product was dried at 50° C. and ground to pass a 50 mesh screen. One thousand three hundred and thirty grams of the crude product were washed three times in 70% methanol by a procedure similar to that described above. Twenty mls. of acetic acid were used in the first washing. The product was air dried overnight with the following results:

Yield _____ 890 grams.
Moisture _____ 8.4%.
2% viscosity _____ 2300 cps.
pH of solution _____ 7.3.
ASH _____ 15.0.
D.S. _____ 0.60 calculated from ash content.

Various samples of the sodium salt of carboxymethyl guar were prepared in accordance with the procedure of Example I and the samples were used in the following examples.

EXAMPLE III

The Na salt of carboxymethyl guar (CMG) having a D.S. of 0.8 was thoroughly washed with 75% $CH_3OH$, dried and dissolved in distilled $H_2O$ to yield a 2% aqueous solution. Fifty ml. portions were mixed with varying amounts of a 20% by weight $CaCl_2$ aqeuous solution.

Measurements of viscosity and thixotropy were taken on an automated Haake rotoviscometer with the following results:

| Ml. 20% $CaCl_2$ | Apparent viscosity centipoise (rate of shear 11.58 sec.) | Plastic viscosity (centipoise) | Thixotropy area, dyne/cm.²-sec. |
|---|---|---|---|
| 0.0 | 851 | 47 | 0 |
| 0.2 [1] | 1,277 | 169 | 0 |
| 0.4 | 993 | 135 | 0 |
| 0.6 | 1,277 | 162 | 0 |
| 0.7 | 1,589 | 223 | 0 |
| 0.8 | 3,716 | 399 | 1,687 |
| 0.9 | 5,560 | 616 | 3,374 |
| 1.0 | 13,500 | 711 | 16,766 |
| 1.2 | 17,000 | | |

[1] 14.4 mg. Ca.

As will be noted from the above table, increased thickening was measurable at a level of about 14.4 mg. of Ca. When $CaCl_2$ solution was added at a level of 1.0 ml., a jelly-like substance resulted. At a level of 1.2 ml. of the calcium solution, a firm gel was formed. It should be noted that distilled water with the Ca removed was used in the preparation of all CMG samples so that the amount of Ca added is a true measure of the amount of Ca present.

EXAMPLE IV

Each of the mixtures of CMG and $CaCl_2$ of Example III was divided into 3 parts. One was mixed with more $CaCl_2$ and the other two were extruded through a syringe into baths containing 2 and 5% $CaCl_2$ respectively. In the cases of extrusion, fibers were formed. In the other instance a precipitate was obtained. When a 2% solution of the precipitate and each of the fiber samples was made a gel was formed upon standing.

EXAMPLE V

Example III was repeated using 2 aliquots, one having a D.S. of 0.6 and the other a D.S. of 1.6, and compared with the thickened product of Example III. Thickened compositions were noticeable even with the least calcium addition. The thickest solution for equivalent calcium addition occurred at a D.S. of 0.8 (as in Example III).

EXAMPLE VI

Example IV was repeated except that Na carboxymethyl guar having a D.S. of 1.6 was used. A water insoluble precipitate was formed when part of the sample was exposed to excess calcium. When the other parts of the sample were extruded into the calcium baths, a water insoluble fiber was obtained.

EXAMPLE VII

The procedures of Examples III and IV were followed with a Na carboxymethyl guar having a D.S. of 1 but calcium acetate and calcium lactate were used in duplicate samples with results similar to those obtained in Examples III and IV. Acetate was better than lactate and $CaCl_2$ formed better thickeners than either. We suspect that solubility or the dissociation of the salt may account for the difference in efficacy here.

EXAMPLE VIII

Na carboxymethyl locust bean gum having a D.S. of 0.8 was substituted for carboxymethyl guar in Examples III and IV with results similar in degree and kind.

Examples IX–XIII show some of the uses of fibers and improved thickening agents possible in the food industry.

EXAMPLE IX

Four aqueous colloidal solutions containing 100 ml. of $H_2O$, 2.5 gm. of Na carboxymethyl guar having a D.S. of 0.8 were made up. Five grams of egg albumen was placed in the first solution, 5 grams of sodium caseinate in the second solution, 5 grams of gelatinized corn starch in the third solution and 5 grams of cooked wheat flour dough in the fourth. Then 3.0 mls. of $CaCl_2$ was added to each of the preparations. All of the examples were extruded into a solution containing 10% calcium acetate and 1% acetic acid and all produced water soluble fibers containing the aforementioned ingredients.

EXAMPLE X

Three colloidal suspensions were made up. The first contained 500 ml. of $H_2O$, 10 grams of Na carboxymethyl guar having a D.S. of 1.6 and 50 grams of defatted soybean flour, the second had 50 grams of yeast cells instead of the soybean flour and the third had 50 grams of whole fish meal instead of the soybean flour. Each solution was extruded through a spinnerette having 0.015 in. holes into a 5% $CaCl_2$ bath. Filaments from each suspension were formed in the bath. The filaments were recovered and washed with distilled $H_2O$. This example indicates a simple method for the manufacture of high protein fibers for use as meat analogues. It also illustrates a method for making water insoluble fibers with 1 step calcium addition.

EXAMPLE XI

The fibers of Example X were mixed with a premix consisting of flavoring agents and the other ingredients listed below. The ingredients were boiled in a plastic bag for 30 minutes and a product having the texture, color, and flavor of ham was produced. The ingredients used for this product were:

| Ingredient: | Amount |
|---|---|
| Fiber | gms 223.2 |
| Bacon fat | gms 89.5 |
| Egg solids | gms 22.3 |
| Cellulose (microcrystalline) | gms 10.9 |
| NaCl | gms 6.8 |
| Brown sugar | gms 6.7 |
| Cerelose (powdered corn syrup solids) | gms 3.3 |
| Sugar | gm 0.8 |
| Garlic salt | gm 0.16 |
| Caramel color | gm 0.31 |
| Red color (of 1% solution) | ml .8 |
| $H_2O$ | ml 133 |
| Butter flavor | gm .03 |
| White pepper | gm .04 |
| Blue color | ml .04 |
| Meat flavor | ml 2.1 |

EXAMPLE XII 1.2 grams of Na carboxymethyl guar having a D.S. of 1 was dissolved in 100 ml. of $H_2O$. 1.3 ml. of 20% $CaCl_2$, 1.2 gms of Na cyclamate, 0.12 gms. of Na saccharin and artificial flavoring and coloring materials were then added to the aqueous solution. After mixing and stirring a syrup having the same consistency as commercially available pancake syrups was produced. This example illustrates the usefulness of calcium carboxymethyl guar as a thickener and stabilizer and its usefulness in low calorie foods.

EXAMPLE XIII

Seventy-five ml. of whole chicken broth was mixed with 1 gm. of Na carboxymethyl guar having a D.S. of 1 and 1.3 ml. of 20% $CaCl_2$. After mixing and stirring a delicious, thick homogeneous gravy was produced.

EXAMPLE XIV

This example illustrates the use of the product of this invention in dairy products. Two grams of Na carboxymethyl guar having a D.S. of 1 was mixed with 2.0 ml. of 20% $CaCl_2$ and added to 100 ml. of whole homogenized milk. A mixture of pudding-like consistency resulted. Thickened beverages such as milk shakes or malted milk could easily be produced by combining the proper ingredients with suitable levels of the product of this invention.

Examples XV to XVII show some of the possible industrial uses of the product of this invention.

EXAMPLE XV

A mixture containing 95.3 grams of $H_2O$, 20 grams of Na carboxymethyl guar having a D.S. of 1.0, 2 grams of glycerin, 0.5 grams of $CaCl_2$ and 0.5 grams of soap was prepared. To this mixture 100 ml. of gasoline was added gradually with agitation. A homogeneous, stable gasoline gel was obtained which would burn when ignited. The gel evidenced no separation after storage at room temperature for 2 weeks.

EXAMPLE XVI

An aqueous gel containing 2% Na carboxymethyl guar having a D.S. of 1.0 and 0.4% $CaCl_2$ was prepared and tested objectively as a hand lotion by laboratory personnel. After rubbing the gel on their hands and drying, all commented that it was neither sticky nor greasy but left a smooth, soft and comfortable feeling on their hands.

EXAMPLE XVII

Fifty ml. of water-based paint was mixed with 20 ml. of 2% calcium carboxymethyl guar gel. A thicker, homogeneous paint was produced.

EXAMPLE XVIII

Example I was repeated except that 100 grams of locust bean gum was dry mixed with 185 grams of powdered sodium chloroacetate. The sodium hydroxide in an amount of 51 grams was dissolved in 100 ml. of water and was added to the dry ingredients over 20 minutes. The reactor was heated to 60° C. for 2.5 hours. The product was washed and dried as in Example I, yielding 151.3 grams of product having a D.S. of 1.43.

To determine the D.S., the ash content of the modified galactomannan was determined according to American Association of Cereal Chemists, method 08–01, Cereal Laboratory Methods, 7th ed., 1962. Upon determination of the ash content, conventional analytical calculations can be used to obtain the D.S. However, to simplify the determination, a plot was prepared as follows and the D.S. determined.

| D.S. | Calculated ash, percent |
|---|---|
| 0.25 | 6 |
| 0.5 | 11 |
| 0.75 | 15.4 |
| 1.0 | 19 |
| 1.25 | 22.1 |
| 1.75 | 27.3 |
| 2.0 | 29.5 |

The embodiments of the invention in which an exclusive property or privilege is claimed are defined as follows:

1. A process of preparing carboxyalkyl ethers of galactomannan gums wherein the ether has a D.S. of 0.6–2.0 comprising:
(a) dry mixing 55 to 190 parts of a halo fatty acid having 2 to 4 carbon atoms in the fatty chain and 100 parts of a galactomannan
(b) adding to the dry mixture an aqueous alkali hydroxide solution containing 20 to 65 parts by weight of alkali hydroxide
(c) heating the hydroxide mixture
(d) drying the reaction mixture thereby recovering the carboxyalkyl ether of galactomannan gum.

2. The process of claim 1 wherein the dried carboxyalkyl ether of galactomannan gum is extracted with an aqueous methanol solution.

3. The process of claim 2 wherein the carboxyalkyl ether of galactomannan gum is neutralized with acetic acid prior to the methanol extraction.

4. The process of claim 1 wherein the galactomannan gum is guar gum and the halo fatty acid is chloroacetic acid.

5. The process of claim 1 wherein the halo fatty acid is present as the salt of a halo fatty acid.

6. The process of claim 5 wherein the salt of the halo fatty acid is sodium chloroacetate.

References Cited

UNITED STATES PATENTS

| | | | |
|---|---|---|---|
| 2,477,544 | 7/1949 | Moe | 260—209 R |
| 2,520,161 | 8/1950 | Moe | 260—209 R |
| 2,599,771 | 6/1952 | Moe | 260—209 R |
| 3,257,380 | 6/1966 | Schweiger | 260—209 R |

LEWIS GOTTS, Primary Examiner

J. R. BROWN, Asssitant Examiner

U.S. Cl. X.R.

99—1, 17, 53, 60, 131, 142, 144; 106—205; 424—361